United States Patent
Kim

(10) Patent No.: US 10,312,486 B2
(45) Date of Patent: Jun. 4, 2019

(54) RECHARGEABLE BATTERY PACK

(71) Applicant: SAMSUNG SDI CO., LTD., Yongin-si, Gyeonggi-do (KR)

(72) Inventor: Myung-Chul Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 266 days.

(21) Appl. No.: 15/227,888

(22) Filed: Aug. 3, 2016

(65) Prior Publication Data

US 2017/0062781 A1    Mar. 2, 2017

(30) Foreign Application Priority Data

Aug. 28, 2015 (KR) .......................... 10-2015-0121992

(51) Int. Cl.
H01M 2/10 (2006.01)
H01M 2/20 (2006.01)

(52) U.S. Cl.
CPC ......... *H01M 2/1077* (2013.01); *H01M 2/206* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 2011/0104552 A1* | 5/2011 | Kim | H01M 2/1016 429/151 |
| 2011/0117409 A1 | 5/2011 | Lee et al. | |
| 2012/0040237 A1* | 2/2012 | Hamada | H01M 2/1077 429/159 |
| 2012/0214046 A1 | 8/2012 | Lim | |
| 2015/0024253 A1 | 1/2015 | Noh | |

FOREIGN PATENT DOCUMENTS

| | | |
|---|---|---|
| KR | 10-2011-0049655 A | 5/2011 |
| KR | 10-2011-0053713 | 5/2011 |
| KR | 10-2012-0007009 A | 1/2012 |
| KR | 10-2012-0096886 A | 8/2012 |
| KR | 10-2015-0010226 A | 1/2015 |

OTHER PUBLICATIONS

KIPO Notice of Allowance dated Oct. 26, 2017, for corresponding Korean Patent Application No. 10-2015-0121992 (5 pages).
KIPO Office Action dated Apr. 27, 2017, for corresponding Korean Patent Application No. 10-2015-0121992 (7 pages).

* cited by examiner

Primary Examiner — Daniel S Gatewood
(74) Attorney, Agent, or Firm — Lewis Roca Rothgerber Christie LLP

(57) ABSTRACT

A rechargeable battery pack according to one or more exemplary embodiments of the present invention includes: unit cells including rechargeable batteries stacked along a first direction; rechargeable battery modules including the unit cells and electrically connected to each other, and including end plates at outermost ends of the rechargeable battery modules; and a combining member connecting the end plates of the rechargeable battery modules, wherein each of the end plates includes: a main body facing the unit cells; a flange bent from the main body and facing the combining member; a first fastening member connecting the flange to the combining member; and a handling opening in the main body at a side of the first fastening member.

15 Claims, 15 Drawing Sheets

RECHARGEABLE BATTERY PACK

CROSS-REFERENCE TO RELATED APPLICATION

This application claims priority to, and the benefit of, Korean Patent Application No. 10-2015-0121992, filed in the Korean Intellectual Property Office on Aug. 28, 2015, the entire contents of which are incorporated herein by reference.

BACKGROUND

1. Field

One or more embodiments of the present invention relate to a rechargeable battery pack.

2. Description of the Related Art

A rechargeable battery differs from a primary battery in that the former is designed to be repeatedly charged and discharged, while the latter is designed to irreversibly convert chemical energy to electrical energy. A small-sized rechargeable battery may be used as a power supply for small electronic devices, such as cellular phones, notebook computers, and camcorders, while a medium or large sized rechargeable battery may be used as a power supply for driving motors in hybrid vehicles and electric vehicles.

The rechargeable battery may be used as a single cell, for example, in a small electronic device, or may be used in a module state where a plurality of cells are electrically connected, or may be used as a pack formed by electrically connecting a plurality of modules, for example, for driving a motor.

A rechargeable battery module is provided with end plates at the outermost edge of the plurality of unit cells, and the rechargeable battery pack is formed by engaging the end plates with a combining member.

The end plate is provided with a flange that is bent from a main body portion that faces the unit cell, and a nut or a bolt is provided in the flange to fasten the flange to the combining member by the bolt or nut. However, when the flange has a narrow width, interference with the main body occurs so that a nut or a bolt cannot be provided in the end plate.

Thus, the combining member cannot be fastened to the end plate of the rechargeable battery module, and accordingly, an additional part for fastening the combining member to the end plate is required. That is, an assembly process of the rechargeable battery pack is difficult.

The above information disclosed in this Background section is only for enhancement of understanding of the background of the invention, and therefore it may contain information that does not form the prior art.

SUMMARY

Aspects of embodiments of the present invention include a rechargeable battery pack that can simplify fastening of a combining member to an end plate of a rechargeable battery module. In addition, one or more exemplary embodiments of the present invention relate to a rechargeable battery pack provided with an end plate that prevents or reduces interference between a fastening member and a main body even if a flange has a narrow width.

A rechargeable battery pack according to one or more exemplary embodiments of the present invention includes unit cells including rechargeable batteries stacked along a first direction, rechargeable battery modules including the unit cells electrically connected to each other, and including end plates at outermost ends of the rechargeable battery modules, and a combining member connecting the end plates of the rechargeable battery modules, wherein each of the end plates includes a main body facing the unit cells, a flange bent from the main body and facing the combining member, a first fastening member connecting the flange to the combining member, and a handling opening in the main body at a side of the first fastening member.

The rechargeable battery pack according to one or more exemplary embodiments of the present invention may further include a second fastening member for connecting the combining member and the first fastening member, and the second fastening member may be combined to the first fastening member through a fastening opening of the combining member.

The first fastening member may include a nut fixed to the flange and located at a first side of the handling opening, and the second fastening member may include a bolt combined to the first fastening member through the fastening opening of the combining member.

The main body may include a separation portion at an upper portion thereof, the separation portion being bent away from the outermost unit cell, and being configured to maintain separation from the outermost unit cell, and the flange may be at an outer side of the separation portion adjacent the upper portion of the main body.

A portion of the first fastening member may be adjacent the separation portion or may overlap the separation portion.

A first bent line between the separation portion and the flange may be adjacent an inner end of the flange, and the handling opening may be spaced apart from the first bent line.

The end plate may further include a bottom flange at a lower portion of the main body, bent away from the outermost unit cell to face the flange, and fixed to a pack bottom plate, and side flanges facing each other at lateral sides of the main body, bent away from the outermost unit cell, and fixed to a module side plate.

The main body may include a separation portion at an upper portion of the main body bent away from the outermost unit cell, the separation portion being configured to maintain separation from the outermost unit cell, and the flange may be at an inner side and an upper end of the separation portion.

A portion of the first fastening member may overlap with the separation portion at the outermost edge that is adjacent the main body or disposed in an inner side of the separation portion.

A first bent line between the separation portion and the flange is at an outer side at a distance from an inner end of the flange, and the handling opening may be defined by the separation portion and may have a height from the first bent line to the flange.

The main body may include a separation portion adjacent an upper portion of the main body, bent away from the outermost unit cell, and configured to maintain separation from the outermost unit cell, and the flange may be overlap an outer side and an inner side at an upper end of the separation portion.

The first fastening member may be located at the separation portion adjacent the main body.

The first bent line between the separation portion and the flange may be between an inner end and an outer end of the flange, and the handling hole may be defined by the separation portion and may have a height from the first bent line to the flange.

The bottom flange may include an elastic portion that is bent vertically.

The end plate may further include a reinforcement rib that protrudes between the main body and the bottom flange.

According to one or more exemplary embodiments of the present invention, a handling opening is provided in an end plate to accommodate a fastening member (e.g., a first fastening member), and the fastening member (e.g., the first fastening member) is provided in a flange in the end plate of a rechargeable battery module so that interference with the fastening member (e.g., the first fastening member) and a main body of the end plate can be prevented or reduced.

Accordingly, the first fastening member can be easily provided in the flange of the end plate. As described, the first fastening member is provided in the flange so that fastening of the combining member to the end plate can be simplified.

DETAILED DESCRIPTION

Figure 1:
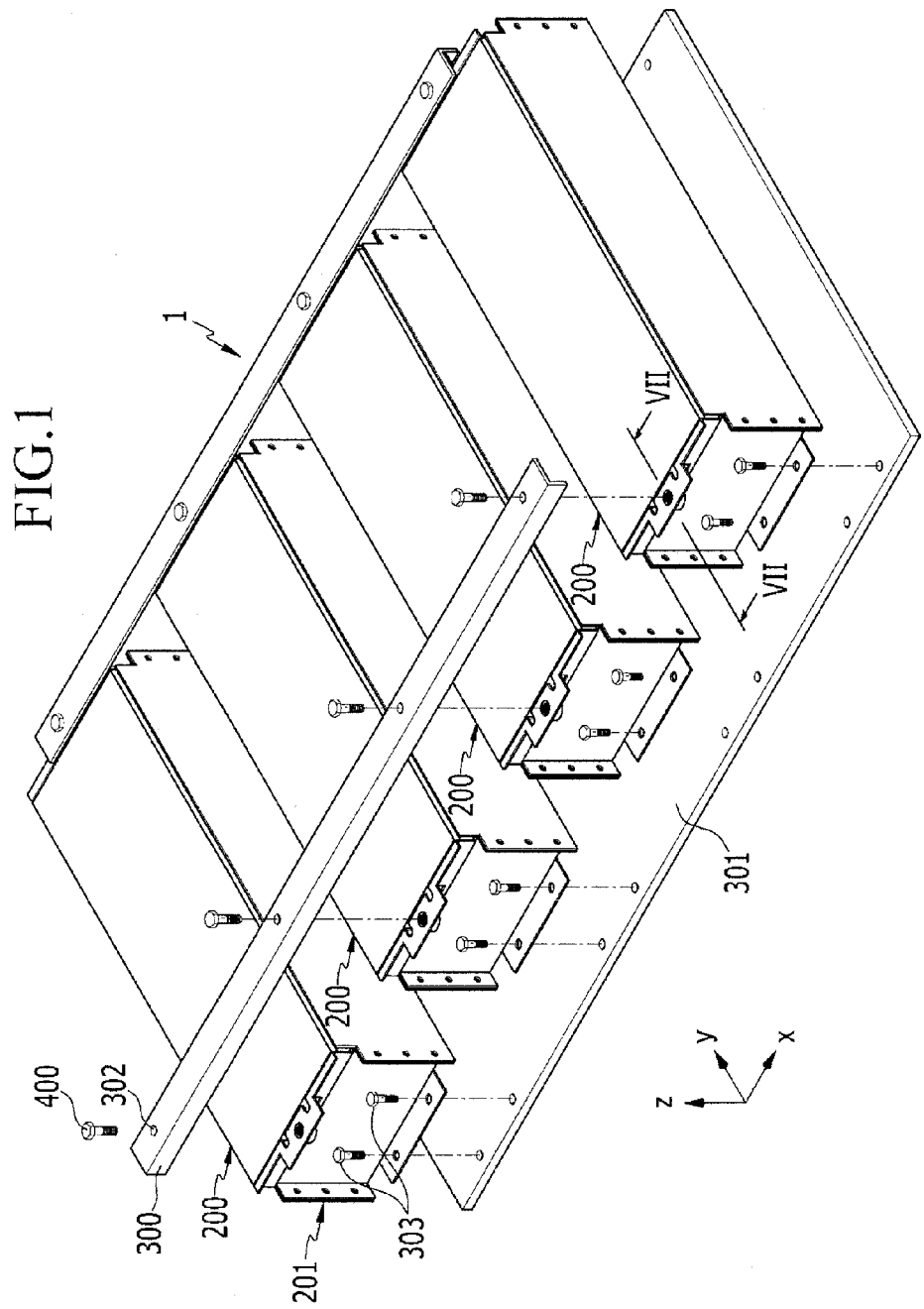
FIG. 1 is an exploded perspective view of a rechargeable battery pack according to one or more exemplary embodiments of the present invention.

The present invention is described more fully hereinafter with reference to the accompanying drawings, in which exemplary embodiments of the invention are shown. As those skilled in the art would realize, the described embodiments may be modified in various different ways, all without departing from the spirit or scope of the present invention. Accordingly, processes, elements, and techniques that are not necessary to those having ordinary skill in the art for a complete understanding of the aspects and features of the present invention may not be described. The drawings and description are to be regarded as illustrative in nature and not restrictive. Like reference numerals designate like elements throughout the attached drawings and the written description, and thus, descriptions thereof may not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on", "coupled to," or "connected to" another element or layer, it can be directly on, coupled to, or connected to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
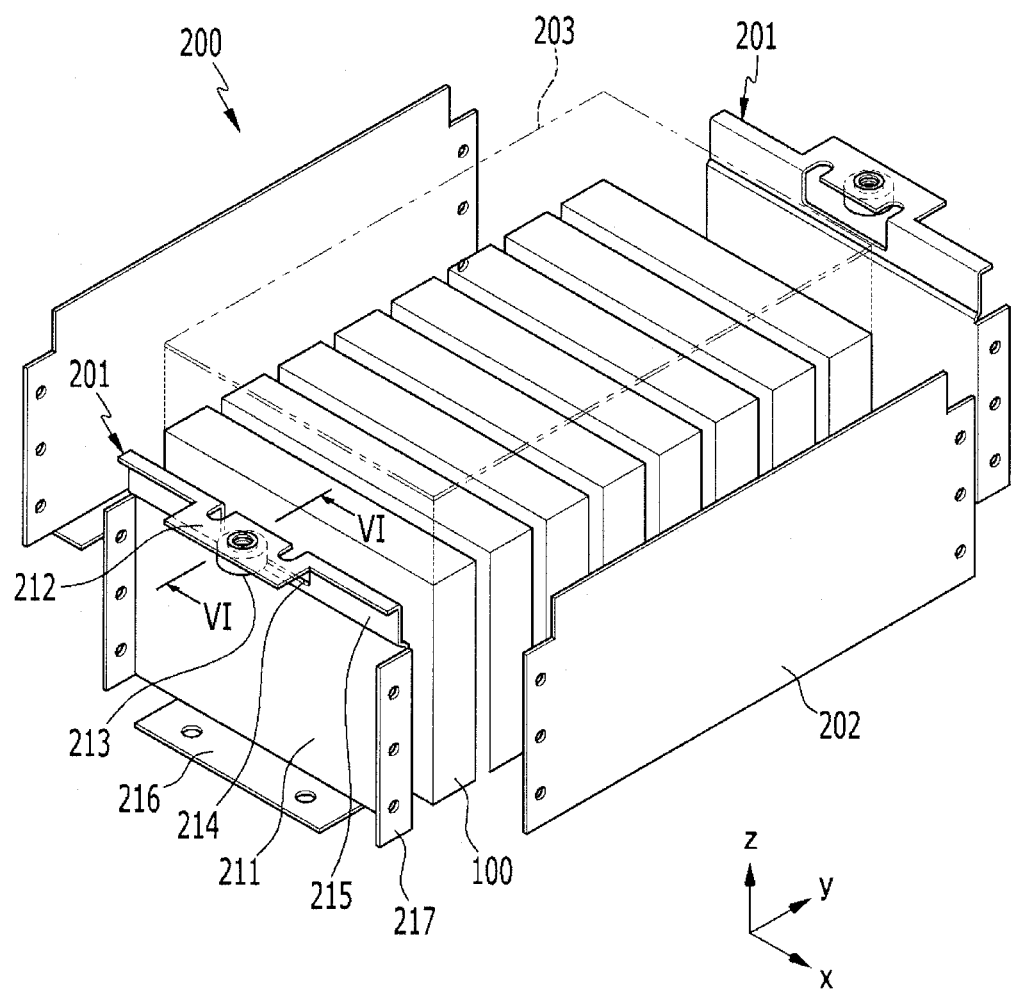
FIG. 2 is an exploded perspective view of a rechargeable battery module of FIG. 1.

FIG. 1 is an exploded perspective view of a rechargeable battery pack according to one or more exemplary embodiments of the present invention, and FIG. 2 is an exploded perspective view of a rechargeable battery module of FIG. 1. Referring to FIG. 1 and FIG. 2, a rechargeable battery pack 1 according to one or more exemplary embodiments of the present invention includes unit cells 100, each formed of a rechargeable battery, rechargeable battery modules 200 electrically connecting the unit cells 100, and a combining member 300 connecting the rechargeable battery modules 200.

The unit cells 100 are arranged to be adjacent each other along a first direction (e.g., a y-axis direction), and are mechanically and electrically connected with each other, thereby forming the rechargeable battery module 200. Each rechargeable battery module 200 is provided with end plates 201 at outermost edges (e.g., lateral outermost edges) of the unit cells 100 (e.g., outermost unit cells of the unit cells 100).

In some embodiments, the rechargeable battery module 200 may be provided with an insulating member between the outermost unit cell 100 and the end plate 201. As such, the end plate 201 substantially supports the insulating member.

The rechargeable battery modules 200 neighbor each other (or are adjacent each other) along a second direction (e.g., an x-axis direction), and are mechanically and electrically connected with each other to form the rechargeable battery pack 1. In the rechargeable battery pack 1, the combining member 300 extends along the x-axis direction, and connects the end plates 201 of the rechargeable battery modules 200 that neighbor each other.

Each battery module 200 includes module side plates 202 that surround lateral sides and lower portions of the unit cells 100, and includes a cover 203 that covers upper portions of the unit cells 100 and that is combined to the module side plates 202.

The end plates 201 are arranged at lateral sides of the rechargeable battery module 200 (e.g., at ends of the rechargeable battery module 200 in the y-axis direction) and are fixed to the module side plates 202 that surround the lower portions and the lateral sides of the unit cells 100. The cover 203 is combined to the module side plates 202, thereby forming the rechargeable battery module 200.

The rechargeable battery pack 1 is provided with a bottom plate (e.g., a pack bottom plate) 301, and the plurality of rechargeable battery modules 200 are disposed on the pack bottom plate 301. The end plates 201 are fixed to the pack bottom plate 301.

Figure 3:
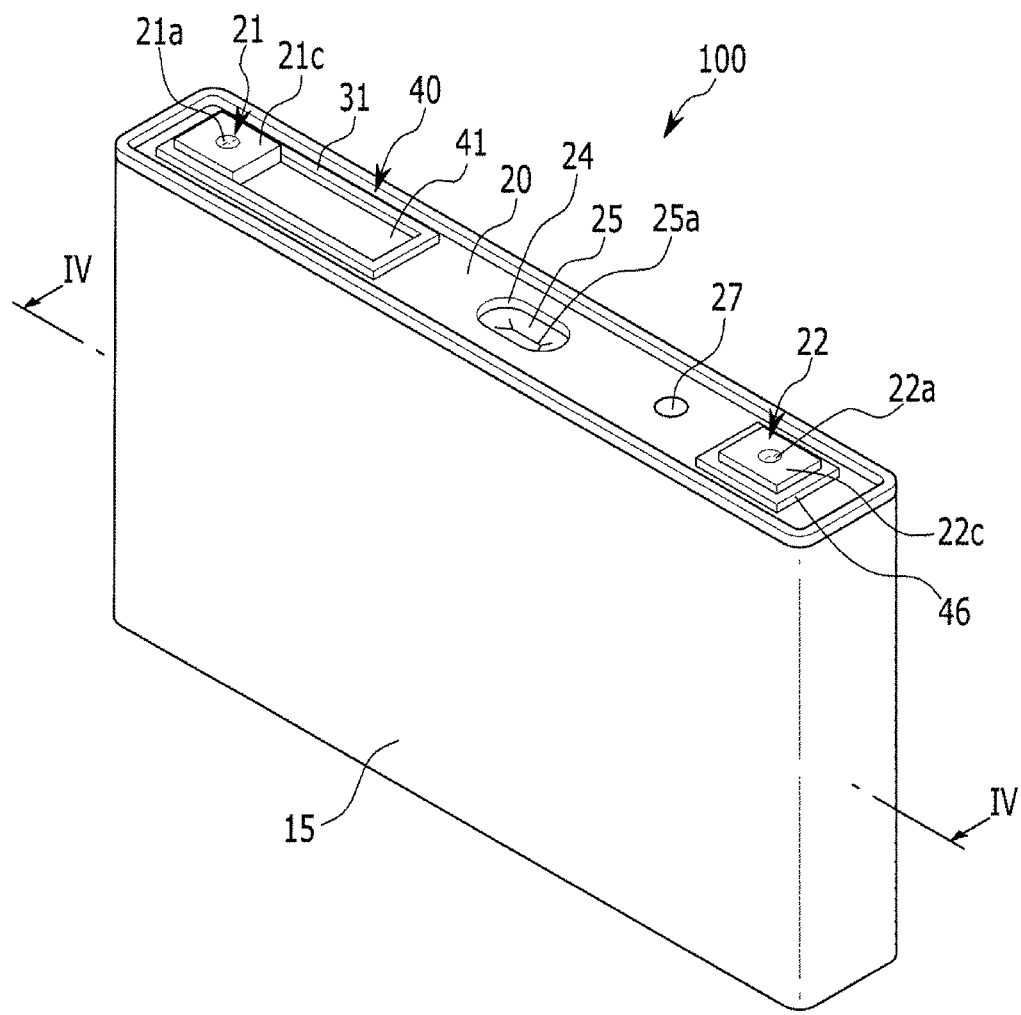
FIG. 3 is a perspective view of a rechargeable battery of FIG. 2.
Figure 4:
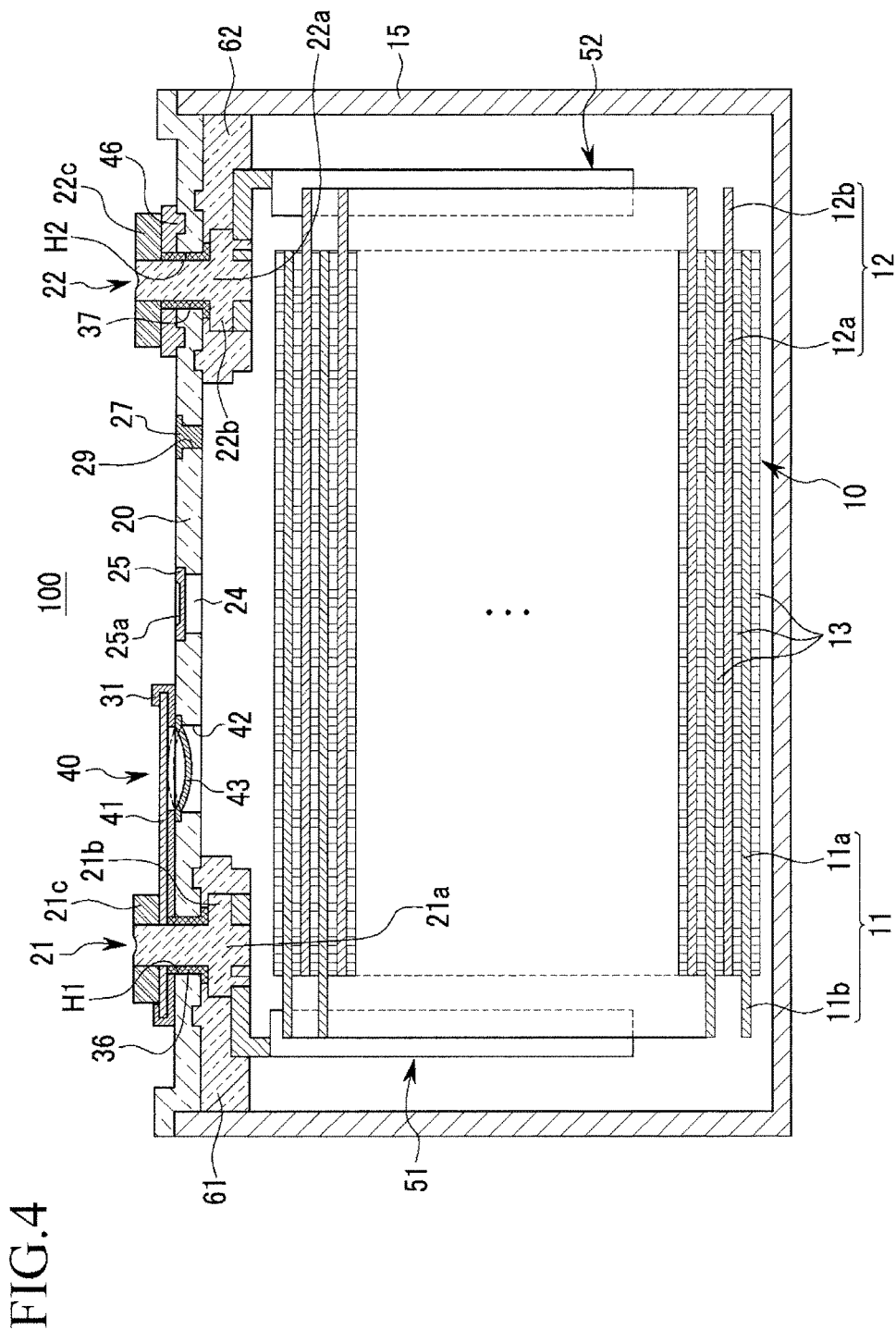
FIG. 4 is a cross-sectional view of the rechargeable battery of FIG. 3, taken along the line IV-IV of FIG. 3.

FIG. 3 is a perspective view of the rechargeable battery of FIG. 2, and FIG. 4 is a cross-sectional view of the rechargeable battery of FIG. 3, taken along the line IV-IV of FIG. 3. Referring to FIG. 3 and FIG. 4, each unit cell 100 includes an electrode assembly 10 for charging and discharging a current, a case 15 that accommodates the electrode assembly 10, a cap plate 20 combined to the case 15 at an opening of the case 15, a first electrode terminal (also referred to herein as a negative terminal) 21 and a second electrode terminal 22 (also referred to herein as a positive terminal) installed in the cap plate 20, and an external short-circuit portion 40 provided in the negative terminal 21.

For example, the electrode assembly 10 may be formed by disposing a first electrode (also referred to herein as a negative electrode) 11 and a second electrode (also referred to herein as a positive electrode) 12 at lateral sides of a separator 13, which is an insulator, and spirally winding the negative electrode 11, the separator 13, and the positive electrode 12 in a jelly roll state.

The negative electrode 11 and the positive electrode 12 respectively include coated regions 11a and 12a, wherein an active material is coated on a current collector of a metal foil, and uncoated regions 11b and 12b, wherein a current collector is not coated with the active material, and thus is exposed.

The uncoated region 11b of the negative electrode 11 is formed at one end of the negative electrode 11 along the spirally wound negative electrode 11. The uncoated region 12b of the positive electrode 12 is formed at one end of the positive electrode 12 along the spirally wound positive electrode 12. The uncoated regions 11b and 12b are respectively disposed at lateral ends of the electrode assembly 10.

For example, the case 15 may have a substantially cuboid shape that provides a space for receiving the electrode assembly 10 and an electrolyte solution therein, and defines an opening in one side of the case. The opening enables the electrode assembly 10 to be inserted into the case 15.

The cap plate 20 is provided at the opening of the case 15 to close and seal the case 15. For example, the case 15 and the cap plate 20 may be made of aluminum and may thus be welded to each other.

Further, the cap plate 20 is provided with an electrolyte injection opening 29, a vent opening (e.g., vent hole) 24, and terminal openings (e.g., terminal holes) H1 and H2. The electrolyte injection opening 29 allows injection of the electrolyte solution into the case 15 when the case 15 is combined to the cap plate 20. After injection of the electrolyte solution, the electrolyte injection opening 29 is sealed by a sealing cap 27.

The vent hole 24 is closed and sealed by a vent plate 25 so as to allow discharge of internal pressure of the unit cell 100. When the internal pressure of the unit cell 100 reaches a sufficient pressure level, the vent plate 25 ruptures to open the vent hole 24. The vent plate 25 includes a notch 25a that induces the rupture.

The negative terminal 21 and the positive terminal 22 are respectively provided in the terminal holes H1 and H2 and are electrically connected to the electrode assembly 10. That is, the negative terminal 21 is electrically connected to the negative electrode 11 of the electrode assembly 10, and the positive terminal 22 is electrically connected to the positive electrode 12 of the electrode assembly 10. Thus, the electrode assembly 10 is drawn out to the outside of the case 15 through the negative terminal 21 and the positive terminal 22.

The negative terminal 21 and the positive terminal 22 may have the same or substantially the same structure inside the cap plate 20. The negative terminal 21 and the positive terminal 22 may have different structures outside of the cap plate 20, and therefore the different structures are individually described.

The negative and positive terminals 21 and 22 respectively include rivet terminals 21a and 22a that are respectively provided in the terminal holes H1 and H2 of the cap plate 20, flanges 21b and 22b that are respectively integrally formed widely in the rivet terminals 21a and 22a at an inner side of the cap plate 20, and plate terminals 21c and 22c that are respectively provided at an outer side of the cap plate 20 and connected to the rivet terminals 21a and 22a by riveting or welding.

Negative and positive gaskets 36 and 37 are respectively provided between the rivet terminals 21a and 22a of the negative and positive terminals 21 and 22 and inner surfaces of the terminal holes H1 and H2 to seal and respectively electrically insulate between the cap plate 20 and the rivet terminals 21a and 22a of the negative and positive terminals 21 and 22.

In addition, the negative and positive gaskets 36 and 37 respectively extend between the flanges 21b and 22b and the inner side of the cap plate 20 to further seal and electrically insulate between the flanges 21b and 22b and the cap plate 20. That is, the negative and positive gaskets 36 and 37 prevent or reduce leakage of the electrolyte solution through the terminal holes H1 and H2 when installing the negative and positive terminals 21 and 22 in the cap plate 20.

Negative and positive electrode lead tabs 51 and 52 respectively electrically connect the negative and positive terminals 21 and 22 to the negative and positive electrodes 11 and 12 of the electrode assembly 10. That is, the negative and positive lead tabs 51 and 52 are respectively connected to lower ends of the rivet terminals 21a and 22a, and the lower ends are caulked such that the negative and positive electrode lead tabs 51 and 52 are respectively connected to the lower ends of the rivet terminals 21a and 22a while being supported by the flanges 21b and 22b.

Negative and positive insulating members 61 and 62 are respectively provided between the negative and positive electrode lead tabs 51 and 52 and the cap plate 20 for electrical insulation between the negative and positive electrode lead tabs 51 and 52 and the cap plate 20. Further, the negative and positive insulating members 61 and 62 are combined to the cap plate 20 through one of the sides thereof, and respectively surround the negative and positive electrode lead tabs 51 and 52 and the rivet terminals 21a and 22a with the other sides thereof, such that a connection structure thereof can be stabilized.

The external short-circuit portion 40 is described below with respect to the plate terminal 21c of the negative terminal 21, and a top plate 46 is described below with respect to the plate terminal 22c of the positive terminal 22.

The external short-circuit portion 40 of the negative terminal 21 includes a short-circuit tab 41 and a short-circuit member 43 that are separated or short-circuited according to an internal pressure of the unit cell 100. The short-circuit tab 41 is electrically connected to the rivet terminal 21a of the negative terminal 21, and is provided at an outer side of the cap plate 20 with an insulating member 31 interposed between the short-circuit tab 41 and the cap plate 20.

The insulating member 31 is provided between the short-circuit tab 41 and the cap plate 20 for electrical insulation between the short-circuit tab 41 and the cap plate 20. As such, the cap plate 20 and the negative terminal 21 are insulated from each other.

The short-circuit tab 41 and the plate terminal 21c are combined to an upper end of the rivet terminal 21a, and the upper end is caulked such that the short-circuit tab 41 and the plate terminal 21c are combined to the upper end of the rivet terminal 21a. Thus, the short-circuit tab 41 and the plate terminal 21c are fixed to the cap plate 20 with the insulating member 31 therebetween.

The short-circuit member 43 is provided in a short-circuit opening (e.g., a short-circuit hole) 42 formed in the cap plate 20. The short-circuit tab 41 is connected to the negative terminal 21, and thus extends along an outer side of the short-circuit member 43. Thus, the short-circuit tab 41 and the short-circuit member 43 correspond to the short-circuit hole 42, and maintain a physically separated state (solid line state in FIG. 4) while facing each other, and may form a short-circuit state (dashed line state in FIG. 4) due to inversion of the short-circuit member 43 when the internal pressure of the rechargeable battery sufficiently increases (e.g., increases to a predetermined value).

The top plate 46 in the positive terminal 22 electrically connects the plate terminal 22c of the positive terminal 22 and the cap plate 20. For example, the top plate 46 is provided between the plate terminal 22c and the cap plate 20, and the rivet terminal 22a penetrates therethrough.

Thus, the top plate 46 and the plate terminal 22c are combined to the upper end of the rivet terminal 22a, and the upper end is caulked such that the top plate 46 and the plate terminal 22c are combined to the upper end of the rivet terminal 22a. The plate terminal 22c is provided at an outer side of the cap plate 20 while the top plate 46 is interposed therebetween.

The positive gasket 37 extends between the rivet terminal 22a and the top plate 46. That is, the positive gasket 37 prevents electrical connection between the rivet terminal 22a and the top plate 46. The rivet terminal 22a is electrically connected to the top plate 46 through the plate terminal 22c.

Figure 5:
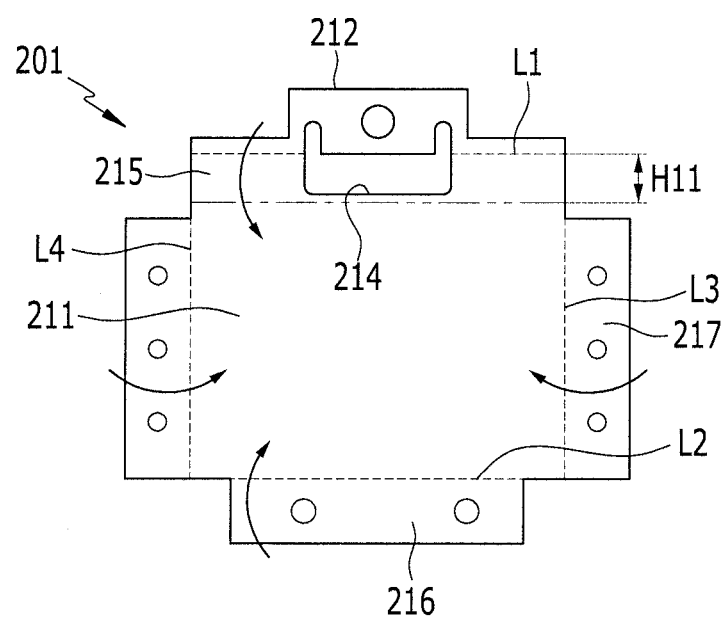
FIG. 5 is a front elevational view illustrating an end plate of the rechargeable battery module of FIG. 2 in an unfolded state.
Figure 6:
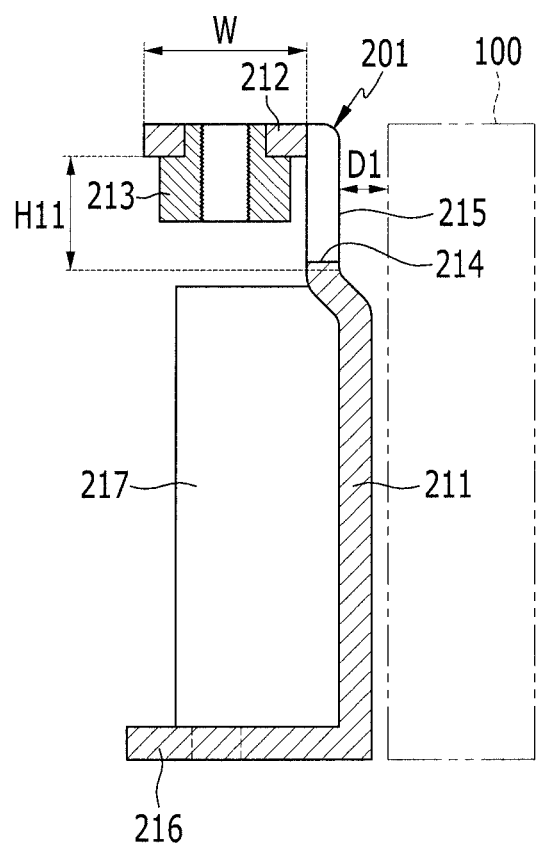
FIG. 6 is a cross-sectional view of the end plate of FIG. 2, taken along the line VI-VI of FIG. 2.

FIG. 5 is a front elevational view of the end plate 201 of FIG. 2 in an unfolded state, and FIG. 6 is a cross-sectional view of the end plate 201 of FIG. 2 taken along the line VI-VI of FIG. 2. Referring to FIG. 2, FIG. 5, and FIG. 6, the end plate 201 includes a main body 211 defined by bending regions of the end plate 201, a flange 212, a first fastening member 213 fixed to the flange 212, and a handling opening (e.g., a handling hole) 214 that is formed by partially cutting the main body 211.

The main body 211 faces the outermost unit cell 100. That is, the main body 211 supports the outermost unit cells (e.g., the outermost lateral unit cells) 100 of the rechargeable battery module 200.

The flange 212 is bent at the main body 211 and faces the combining member 300. The first fastening member 213 is combined to, or defines, a fixing opening (e.g., a fixing hole) of the flange 212, and is combined to the combining member 300 of the rechargeable battery pack 1 (refer to FIG. 1 and FIG. 7), thereby fixing the first fastening member 213 to the flange 212.

The first fastening member 213 supplements strength of the flange 212, and thus a fastening force between the flange 212 and the combining member 300 that face each other can be improved when they are combined to each other. As an example, the first fastening member 213 may be welded or clinched to the flange 212.

The handling hole 214 is formed in the main body 211 adjacent to the first fastening member 213. As such, an installation range of the first fastening member 213 in the flange 212 can be increased. That is, the handling hole 214 provides access to the first fastening member 213 through the main body 211 (e.g., provides access in the y-axis direction) such that the first fastening member 213, which provides supplemental strength to the rechargeable battery pack 1, can be smoothly installed.

Figure 7:
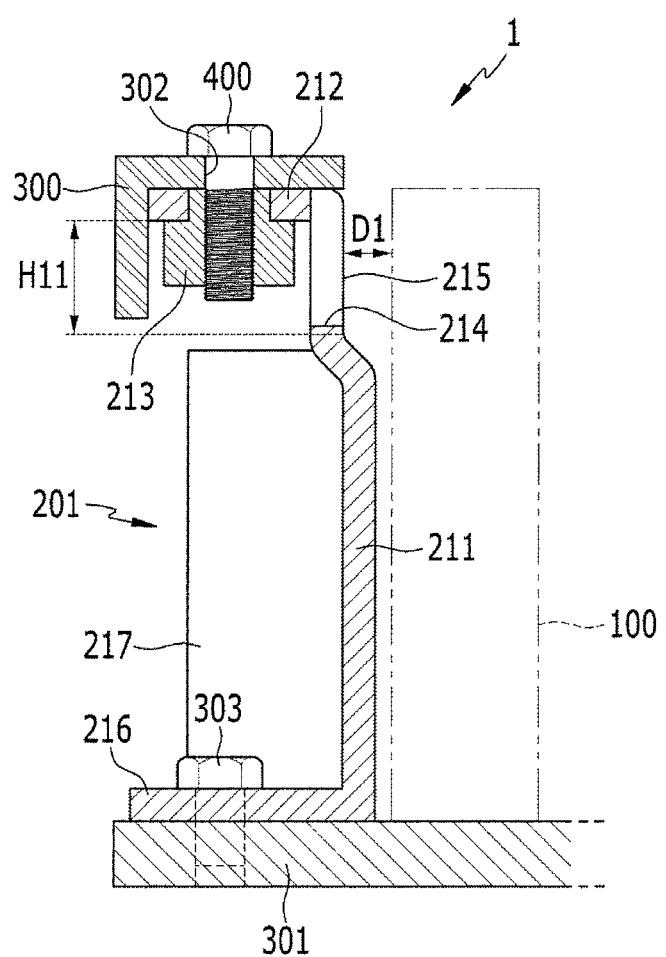
FIG. 7 is a cross-sectional view of some components of the rechargeable battery pack of FIG. 1, taken along the line VII-VII of FIG. 1.

FIG. 7 is a cross-sectional view of some components of the rechargeable battery pack 1 of FIG. 1, taken along the line VII-VII of FIG. 1. Referring to FIG. 1 and FIG. 7, the rechargeable battery pack 1 according to one or more exemplary embodiments of the present invention further includes a second fastening member 400 that connects the combining member 300 and the first fastening member 213 to each other.

The combining member 300 is provided on the flange 212 of the end plate 210 to integrally combine the rechargeable battery modules 200. In some embodiments, the second fastening member 400 is combined to the first fastening member 213 of the flange 212 through a fastening opening (e.g., a fastening hole) 302 of the combining member 300.

Referring to FIG. 2, FIG. 6, and FIG. 7, the first fastening member 213 according to one or more exemplary embodiments of the present invention is fixed to the flange 212, and may include a nut provided at one side of the handling hole 214. That is, the first fastening member 213 may be combined to the flange 212 with a clinching nut to fix the fastening member 213. The second fastening member 400 may include a bolt coupled to the first fastening member 213 through the fastening hole 302 of the combining member 300.

In some embodiments, the first fastening member 213 may include a bolt that is fixed via the fixing hole of the flange 212, and the second fastening member 400 may include a nut provided at the outer surface of the combining member 300 corresponding to the fastening hole 302 of the combining member 300, such that the first fastening member 213 and the second fastening member 400 can be combined to each other (e.g., as a nut and bolt).

Referring to FIG. 5 to FIG. 7, the main body 211 of the end plate 201 includes a separation portion 215 that is bent to the outside away from (e.g., away from, and generally in parallel to) the outermost unit cell 100 at the upper portion of the rechargeable battery module 200 to maintain separation (e.g., to maintain a predetermined separation distance D1) from the outermost unit cell 100. In some embodiments, the end plate 201 (e.g., the main body 211) may omit the separation portion 215.

The flange 212 is disposed at an outer side and at an upper end of the separation portion 215. That is, the flange 212 is separated from the unit cell 100 by the separation distance D1. The first fastening member 213 is adjacent the separation portion 215 at an edge of the separation portion 215 that is opposite to the main body 211. In some embodiments, the first fastening member 213 may overlap with (or extend past) the separation portion 215 toward the unit cell 100.

The handling hole 214 partially receives the first fastening member 213 adjacent the unit cell 100, and therefore the first fastening member 213 can be provided in the flange 212 regardless of a width W of the flange 212 (e.g., even if the fastening member 213 is wider than the flange 212).

The separation portion 215 and the flange 212 of the end plate 201 are bent along a first bent line L1. That is, the flange 212 is bent away from the unit cell 100, and is bent along a first bent line L1 that defines a boundary between the separation portion 215 and the flange 212.

Thus, the first bent line L1, which distinguishes the separation portion 215 and the flange 212, is defined at an inner end of the flange 212, and the handling hole 214 is formed in the separation portion 215. The separation portion 215 has a first height H11. In other words, the first height H11 of the separation portion 215 is defined by the first bent line L1 and a bottom edge of the separation portion 215.

The end plate 201 further includes a bottom flange 216 and side flanges 217. The bottom flange 216 is bent from the outermost unit cell 100 with reference to a second bent line L2 in the lower portion of the main body 211 and is connected to the main body 211 at the second bent line L2. Thus, the bottom flange 216 faces the flange 212 in a third direction (e.g., a vertical direction or a z-axis direction).

Further, the bottom flange 216 is fixed to the pack bottom plate 301 with a fixing bolt 303 in the rechargeable battery pack 1 (refer to FIG. 1 and FIG. 7). That is, the bottom flanges 216 of the end plates 201 of the rechargeable battery modules 200 are fixed to the pack bottom plate 301 to form the rechargeable battery pack 1.

The side flanges 217 are respectively bent away from the outermost unit cell 100 with reference to third and fourth bent lines L3 and L4 at lateral sides of the main body 211, and are thus connected to the main body 211. Thus, the side flanges 217 at lateral sides face each other (e.g., in an x-axis direction), and are fixed to the module side plate 202. That is, the side flanges 217 of the end plates 201 are fixed to the module side plate 202 to form the rechargeable battery module 200.

Hereinafter, various exemplary embodiments of the present invention are described. A description of the same or similar configurations as those of the exemplary embodiments described above may be omitted, and different configurations from those of the exemplary embodiments described above may be described.

Figure 8:
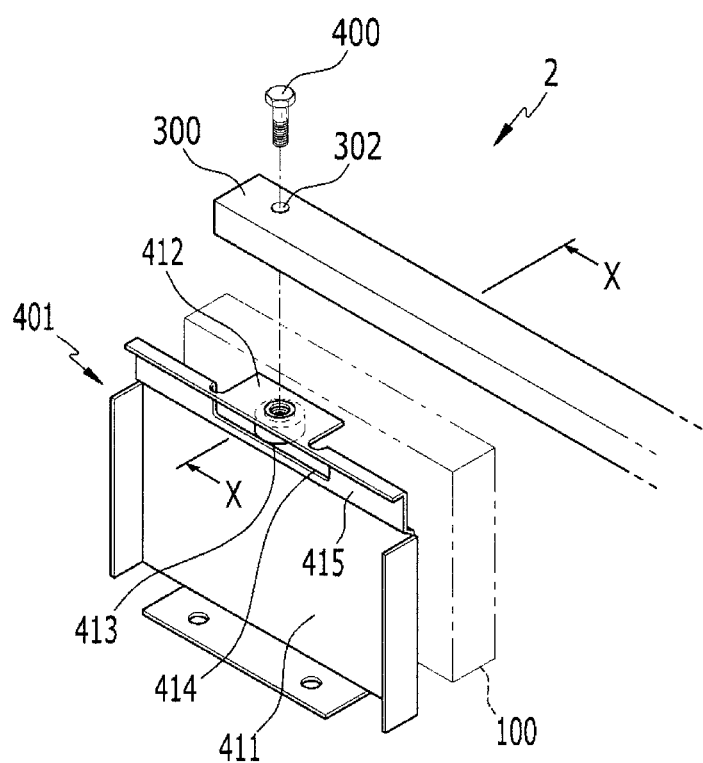
FIG. 8 is an exploded perspective view of some components of a rechargeable battery pack according to one or more exemplary embodiments of the present invention.
Figure 9:
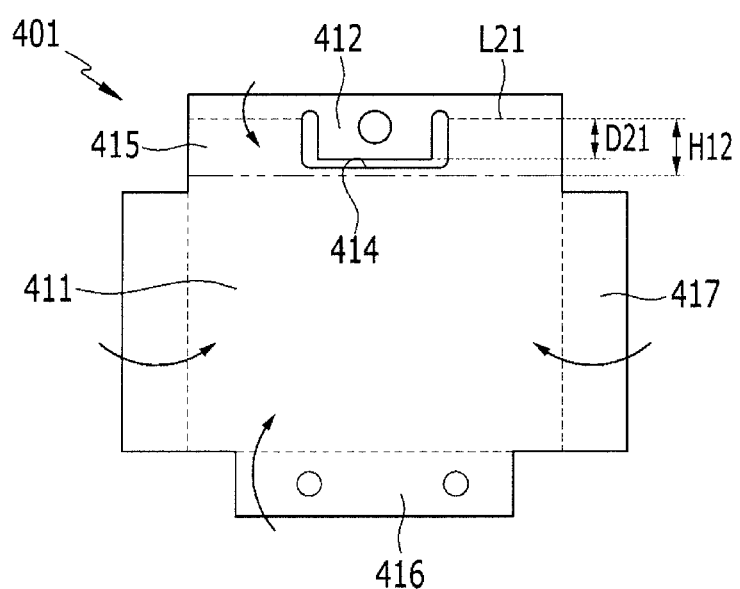
FIG. 9 is a front elevational view illustrating an end plate of the rechargeable battery pack of FIG. 8 in an unfolded state.
Figure 10:
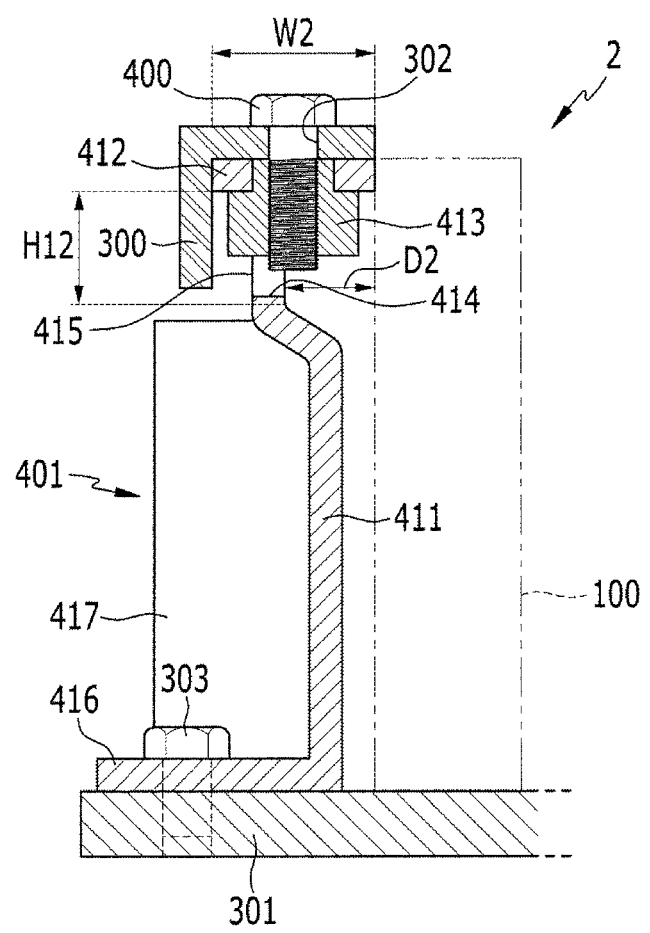
FIG. 10 is a cross-sectional view of some components of the rechargeable battery pack of FIG. 8, taken along the line X-X of FIG. 8.

FIG. 8 is an exploded perspective view of some components of a rechargeable battery pack according to one or more exemplary embodiments of the present invention, FIG. 9 is a front elevational view of an end plate of the rechargeable battery pack of FIG. 8, and FIG. 10 is a cross-sectional view of some components of the rechargeable battery pack of FIG. 8, taken along the line X-X of FIG. 8.

Referring to FIG. 8 to FIG. 10, in an end plate 401 of a rechargeable battery module of a rechargeable battery pack 2 according to one or more exemplary embodiments of the present invention, a main body 411 includes a separation portion 415 that is bent to an outer side and away from the outermost unit cell 100 in an upper portion of the rechargeable battery module to maintain separation (e.g., to maintain a predetermined separation distance D2) from the outermost unit cell 100.

A flange 412 is disposed at an inner side of the upper end of the separation portion 415. That is, the flange 412 may be separated from, and may extend toward, the unit cell 100 within a range of the separation distance D2. A first fastening member 413 overlaps with the separation portion 415 adjacent an outer edge of the main body 411. In some embodiments, the first fastening member 413 may be at an inner side of the separation portion 415 (e.g., at the unit cell 100 side).

A handling opening (e.g., a handling hole) 414 receives most of the first fastening member 413 at the unit cell 100, and thus the flange 412 can be provided with the first fastening member 413 at an outer side of the separation portion 415 regardless of a width W2 of the flange 412.

The first fastening member 213 of the flange 212 of the first exemplary embodiment of the present invention (described above) may be primarily disposed in the outer side of the separation portion 215, while the first fastening member 413 of the flange 412 of the present exemplary embodiment of the present invention may be primarily disposed in an inner side of the separation portion 415 (e.g., toward the unit cell 100).

The separation portion 415 and the flange 412 are bent along a first bent line L21. That is, the flange 412 is bent with reference to the first bent line L21 defined in the main body 411 between the separation portion 415 and the flange 412.

Thus, the first bent line L21 of the separation portion 415 and the flange 412 are at an outer side of the end plate. The separation portion 415 is a separation distance D21 of an inner end of the flange 412 that is bent toward the unit cell 100, and the handling hole 414 is formed in the separation portion 415 with a second height H12 from the first bent line L21.

Figure 11:
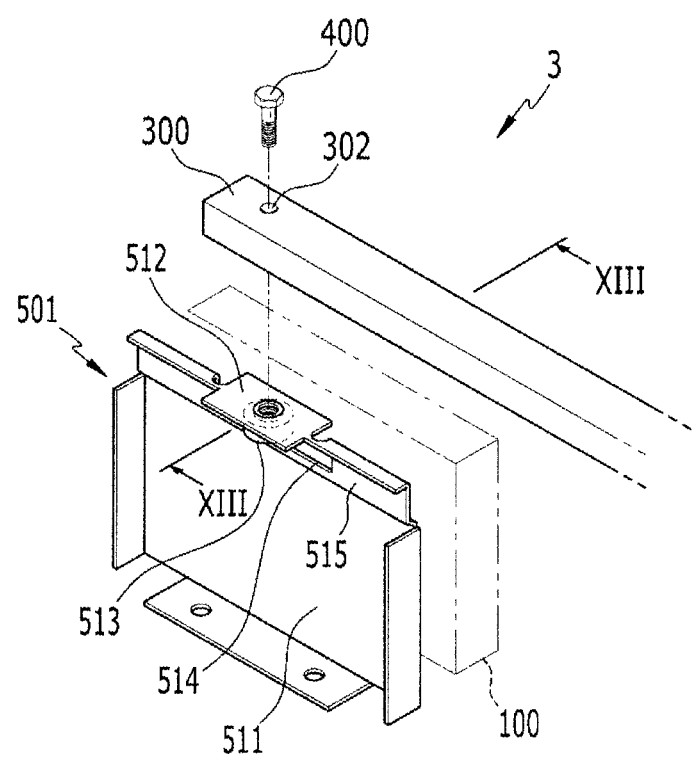
FIG. 11 is an exploded perspective view of some components of a rechargeable battery pack according to one or more exemplary embodiments of the present invention.
Figure 12:
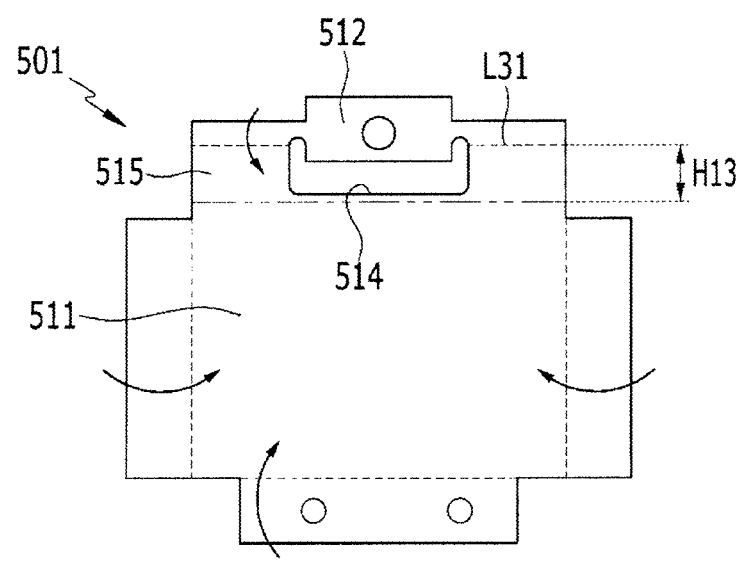
FIG. 12 is a front elevational view illustrating an end plate of the rechargeable battery pack of FIG. 11 in an unfolded state.
Figure 13:
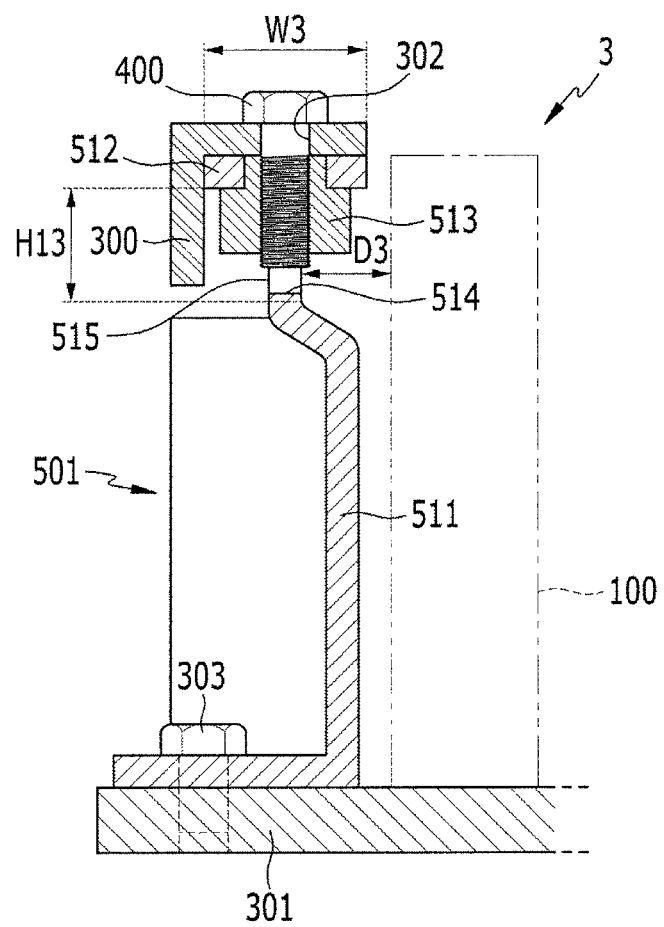
FIG. 13 is a cross-sectional view of some components of the rechargeable battery pack of FIG. 11, taken along the line XIII-XIII of FIG. 11.

FIG. 11 is an exploded perspective view of some components of a rechargeable battery pack according to one or more exemplary embodiments of the present invention, FIG. 12 is a front elevational view of an end plate of the rechargeable battery pack of FIG. 11, and FIG. 13 is a cross-sectional view of some components of the rechargeable battery pack of FIG. 11, taken along the line XIII-XIII of FIG. 11.

Referring to FIG. 11 to FIG. 13, in a rechargeable battery pack 3 according to one or more exemplary embodiments of the present invention, a main body 511 of an end plate 501 of a rechargeable battery module includes a separation portion 515 that is bent away from the outermost unit cell 100 at an upper portion of the rechargeable battery module 500 to maintain separation (e.g., maintain a predetermined separation distance D3) from the outermost unit cell 100.

A flange 512 overlaps with an outer side and an inner side of an upper end of the separation portion 515. That is, the flange 512 may be separated from the unit cell 100 within a range of the separation distance D3, and may protrude from, or extend past, the separation portion 515 toward the outside. A first fastening member 513 is disposed at an outer edge of the separation portion 515 adjacent the main body 511.

A handling opening (e.g., a handling hole) 514 receives an inner side portion of the first fastening member 513 that is adjacent the unit cell 100, and receives an outer side portion of the first fastening member 513 at an outer side of the separation portion 515, and therefore the flange 512 can be provided with the first fastening member 513 regardless of a width W3 of the flange 512.

The first fastening member 213 of the flange 212 of the first exemplary embodiment of the present invention (described above) may be primarily disposed in the outer side of the separation portion 215, and the first fastening member 413 of the flange 412 of the second exemplary embodiment of the present invention (described above) may be primarily disposed at an inner side of the separation portion 415. In the present embodiment, substantially each half of the first fastening member 513 is respectively located in an inner side and in an outer side of the separation portion 515.

The separation portion 515 and the flange 512 are set in the end plate 501, and are separated by a first bent line L31. That is, the end plate 501 is bent to the outer side (away from the unit cell 100) with reference to the first bent line L31 between the flange 512 and the separation portion 515, and therefore the flange 512 is connected to the separation portion 515.

Thus, the first bent line L31 of the separation portion 515 and the flange 512 is in a center portion of (e.g., halfway between an inner end and an outer end of) the flange 512, and the handling hole 514 is formed in the separation portion 515 with a third height H13 from the first bent line L31.

Figure 14:
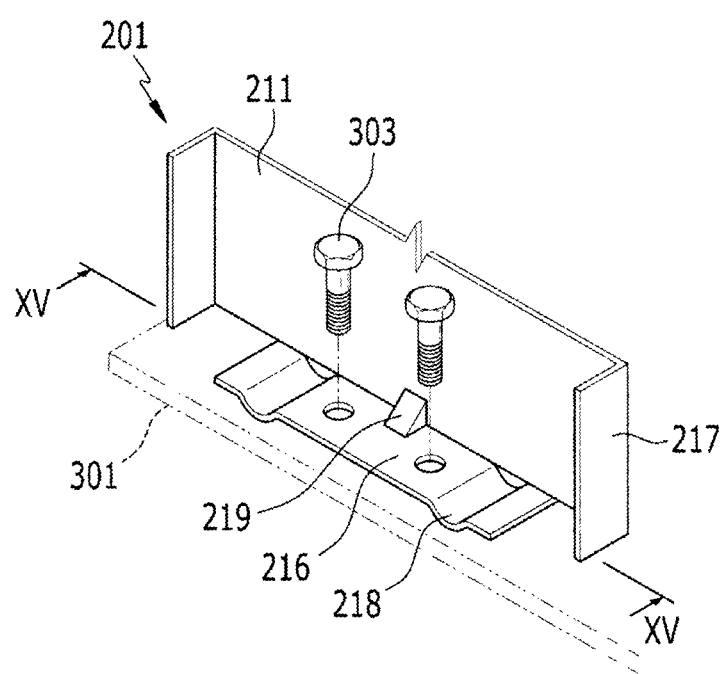
FIG. 14 is a perspective view of a part of an end plate and a pack plate of a rechargeable battery pack according to one or more exemplary embodiments of the present invention.
Figure 15:
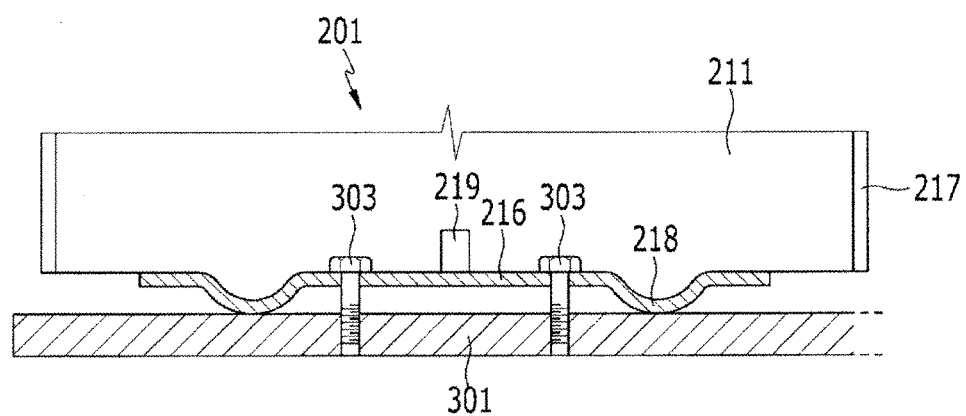
FIG. 15 is a cross-sectional view of the part of the end plate and the pack plate of FIG. 14, taken along the line XV-XV of FIG. 14.

FIG. 14 is an exploded perspective view of an end plate and a pack plate in a rechargeable battery pack according to one or more exemplary embodiments of the present invention, and FIG. 15 is a cross-sectional view of the part of the end plate and the pack plate of FIG. 14, taken along the line XV-XV of FIG. 14.

Referring to FIG. 1, FIG. 14, and FIG. 15, in the end plate 201 of the rechargeable battery pack 1 according to one or more exemplary embodiments of the present invention, the bottom flange 216 further includes an elastic portion 218 bent in the third direction (e.g., vertically bent) and thus deformed in the third vertical direction.

The bottom flange 216 of the end plate 201 is fixed to the pack bottom plate 301 via the bottom flange 216 to form the rechargeable battery pack 1. Thus, vibration or external impact transferred to the rechargeable battery pack 1 may be absorbed and thus released in the elastic portion 218 of the bottom flange 216.

The end plate 201 further includes a reinforcement rib 219 that protrudes between the main body 211 and a bent portion of the bottom flange 216. The reinforcement rib 219 reinforces strength of the bottom flange 216, and thus mechanical strength of the rechargeable battery module 200 and the rechargeable battery pack 1 can be improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims and their equivalents.

What is claimed is:

1. A rechargeable battery pack comprising:
   unit cells comprising rechargeable batteries stacked along a first direction;
   rechargeable battery modules comprising the unit cells electrically connected to each other, and comprising end plates at outermost ends of the rechargeable battery modules; and
   a combining member connecting the end plates of the rechargeable battery modules,
   wherein each of the end plates comprises:
      a main body facing the unit cells;
      a flange bent from the main body and facing the combining member;
      a first fastening member for connecting the flange to the combining member; and
      a handling opening in the main body at a side of the first fastening member,
   wherein the flange is located above the handling opening, and
   wherein the flange is at an uppermost portion of the end plate.

2. The rechargeable battery pack of claim 1, further comprising a second fastening member for connecting the combining member and the first fastening member,
   wherein the second fastening member is combined to the first fastening member through a fastening opening of the combining member.

3. The rechargeable battery pack of claim 2, wherein the first fastening member comprises a nut fixed to the flange and located at a first side of the handling opening, and
   wherein the second fastening member comprises a bolt combined to the first fastening member through the fastening opening of the combining member.

4. The rechargeable battery pack of claim 1, wherein the main body comprises a separation portion at an upper portion thereof, the separation portion being bent away from the outermost unit cell, and being configured to maintain separation from the outermost unit cell, and wherein the flange is at an outer side of the separation portion adjacent the upper portion of the main body.

5. The rechargeable battery pack of claim 4, wherein a portion of the first fastening member is adjacent the separation portion or overlaps the separation portion.

6. The rechargeable battery pack of claim 5, wherein a first bent line between the separation portion and the flange is adjacent an inner end of the flange, and wherein the handling opening is spaced apart from the first bent line.

7. The rechargeable battery pack of claim 4, wherein the end plate further comprises:

a bottom flange at a lower portion of the main body, bent away from the outermost unit cell to face the flange, and fixed to a pack bottom plate; and side flanges facing each other at lateral sides of the main body, bent away from the outermost unit cell, and fixed to a module side plate.

8. The rechargeable battery pack of claim 1, wherein the main body comprises a separation portion at an upper portion of the main body bent away from the outermost unit cell, the separation portion being configured to maintain separation from the outermost unit cell, and wherein the flange is at an inner side and at an upper end of the separation portion.

9. The rechargeable battery pack of claim 8, wherein the first fastening member overlaps with the separation portion at the outermost edge that is adjacent the main body, or at an inner side of the separation portion.

10. The rechargeable battery pack of claim 9, wherein a first bent line between the separation portion and the flange is at an outer side at a distance from an inner end of the flange, and wherein the handling opening is defined by the separation portion and has a height from the first bent line to the flange.

11. The rechargeable battery pack of claim 1, wherein the main body comprises a separation portion adjacent an upper portion of the main body, bent away from the outermost unit cell, and configured to maintain separation from the outermost unit cell, and wherein the flange overlaps an outer side and an inner side at an upper end of the separation portion.

12. The rechargeable battery pack of claim 11, wherein the first fastening member is located at the outermost edge of the separation portion adjacent the main body.

13. The rechargeable battery pack of claim 12, wherein a first bent line between the separation portion and the flange is between an inner end and an outer end of the flange, and wherein the handling opening is defined by the separation portion and has a height from the first bent line to the flange.

14. The rechargeable battery pack of claim 7, wherein the bottom flange comprises an elastic portion that is bent vertically.

15. The rechargeable battery pack of claim 7, wherein the end plate further comprises a reinforcement rib that protrudes between the main body and the bottom flange.

* * * * *